(12) United States Patent
Yamada

(10) Patent No.: US 10,948,783 B2
(45) Date of Patent: Mar. 16, 2021

(54) LIQUID CRYSTAL APPARATUS AND ELECTRONIC DEVICE

(71) Applicant: SEIKO EPSON CORPORATION, Tokyo (JP)

(72) Inventor: Shuhei Yamada, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/872,503

(22) Filed: May 12, 2020

(65) Prior Publication Data

US 2020/0363668 A1 Nov. 19, 2020

(30) Foreign Application Priority Data

May 13, 2019 (JP) .............................. JP2019-090457

(51) Int. Cl.
*G02F 1/133* (2006.01)
*G02F 1/1339* (2006.01)
*G02F 1/1337* (2006.01)

(52) U.S. Cl.
CPC ...... *G02F 1/1339* (2013.01); *G02F 1/133711* (2013.01)

(58) Field of Classification Search
CPC .................................................... G02F 1/1339
See application file for complete search history.

(56) References Cited

U.S. PATENT DOCUMENTS

2005/0128367 A1 6/2005 Hoke et al.
2018/0267347 A1* 9/2018 Tanaka .............. G02F 1/133719

FOREIGN PATENT DOCUMENTS

| JP | H06-175142 A | 6/1994 | |
|---|---|---|---|
| JP | 2002-014354 A | 1/2002 | |
| JP | 2007-514204 A | 5/2007 | |
| JP | 2007-140008 A | 6/2007 | |
| JP | 2007140008 | * 6/2007 | ............. G02F 1/133 |
| JP | 2014-010210 A | 1/2014 | |

* cited by examiner

*Primary Examiner* — Sang V Nguyen
(74) *Attorney, Agent, or Firm* — JCIPRNET

(57) ABSTRACT

In a liquid crystal apparatus, a liquid crystal is provided in a cavity surrounded by a seal material between a first substrate and a second substrate. Between a display area on an inner side of the seal material and the seal material, a circulation flow path coupled to the display area is constituted by the seal material and a partition. The partition is formed simultaneously with the seal material. The circulation flow path is provided with a forced circulation apparatus configured to forcibly cause the liquid crystal of the circulation flow path to flow. The circulation flow path has a higher adsorptivity for ions than the display area, and ionic impurities contained in the liquid crystal passing through the circulation flow path are removed from the liquid crystal in the circulation flow path.

10 Claims, 14 Drawing Sheets

LIQUID CRYSTAL APPARATUS AND ELECTRONIC DEVICE

The present application is based on, and claims priority from JP Application Serial Number 2019-090457, filed May 13, 2019, the disclosure of which is hereby incorporated by reference herein in its entirety.

BACKGROUND

1. Technical Field

The present disclosure relates to a liquid crystal apparatus in which a circulation flow path of a liquid crystal is provided between a pair of substrates, and an electronic device.

2. Related Art

A liquid crystal apparatus includes a pair of substrates, a seal material that bonds the pair of substrates to each other, and a liquid crystal held in a region surrounded by the seal material between the pair of substrates. In such a liquid crystal apparatus, when the liquid crystal is irradiated with light from a light source for a long period of time, decomposition or polymerization of the liquid crystal occurs, causing the liquid crystal to deteriorate. As a result, optical modulation characteristics of the liquid crystal apparatus change, and a reliability of an electronic device, such as a projection-type display apparatus, is reduced. On the other hand, there has been proposed a technique of providing a circulation flow path that causes the liquid crystal to flow between an inner edge and an outer edge of the seal material, increasing a liquid crystal volume encapsulated between the pair of substrates, and causing the liquid crystal to convect through the circulation flow path, thereby extending the time until the entire liquid crystal deteriorates (refer to JP-A-2007-140008). Further, in JP-A-2007-140008, there is proposed a technique of providing an adsorption apparatus at an intermediate position of a circulation flow path, and adsorbing products produced when the liquid crystal material deteriorates.

Nevertheless, in a structure in which an adsorption apparatus including a porous glass filter, molecular sieves, and the like is placed at an intermediate position of a circulation flow path such as the structure described in JP-A-2007-140008, the adsorption apparatus is small and an adsorptivity for ions of the adsorption apparatus is low, resulting in saturation in a relatively short time. Further, in a structure in which an adsorption apparatus is placed at an intermediate position of a circulation flow path, a flow path resistance increases, and thus the liquid crystal does not flow smoothly in the circulation flow path. As a result, in the structure described in JP-A-2007-140008, there is a problem in that, in a liquid crystal apparatus and an electronic device provided with a liquid crystal apparatus, the time until the entire liquid crystal deteriorates cannot be further extended.

SUMMARY

To solve the above-described problems, a liquid crystal apparatus according to the present disclosure includes a pair of substrates, a seal material provided between the pair of substrates, a liquid crystal provided between the pair of substrates on an inner side of the seal material, and a circulation flow path provided between a display area on an inner side of the seal material and the seal material, and configured to cause the liquid crystal to flow. The circulation flow path has a higher adsorptivity for ions than the display area.

According to an aspect of the present disclosure, a liquid crystal apparatus includes a pair of substrates, a seal material provided between the pair of substrates, a liquid crystal provided between the pair of substrates on an inner side of the seal material, a circulation flow path provided between a display area on an inner side of the seal material and the seal material, and configured to cause the liquid crystal to flow, and an alignment film provided to the display area and the circulation flow path. A surface of the alignment film that is provided to the display area is provided with an organic silane compound layer, and a surface of the alignment film that is provided to the circulation flow path is not provided with an organic silane compound layer.

According to another aspect of the present disclosure, a liquid crystal apparatus includes a pair of substrates, a seal material provided between the pair of substrates, a liquid crystal provided between the pair of substrates on an inner side of the seal material, a circulation flow path provided between a display area on an inner side of the seal material and the seal material, and configured to cause the liquid crystal to flow, and an alignment film provided to the display area and the circulation flow path. The alignment film that is provided to the circulation flow path has a lower formation density than the alignment film provided to the display area.

According to another aspect of the present disclosure, a liquid crystal apparatus includes a pair of substrates, a seal material provided between the pair of substrates, a liquid crystal provided between the pair of substrates on an inner side of the seal material, and a circulation flow path provided between a display area on an inner side of the seal material and the seal material, and configured to cause the liquid crystal to flow. The display area is provided with an alignment film, and the circulation flow path is provided with an ion adsorption layer having a higher adsorptivity for ions than the alignment film.

The liquid crystal apparatus to which the present disclosure is applied may be used in various types of electronic devices such as a direct-view-type display apparatus and a projection-type display apparatus. When an electronic device is a projection-type display apparatus, the projection-type display apparatus includes a light source unit configured to emit light to be supplied to the liquid crystal apparatus, and a projection optical system configured to project light modulated by the liquid crystal apparatus.

DESCRIPTION OF EXEMPLARY EMBODIMENTS

Figure 1:
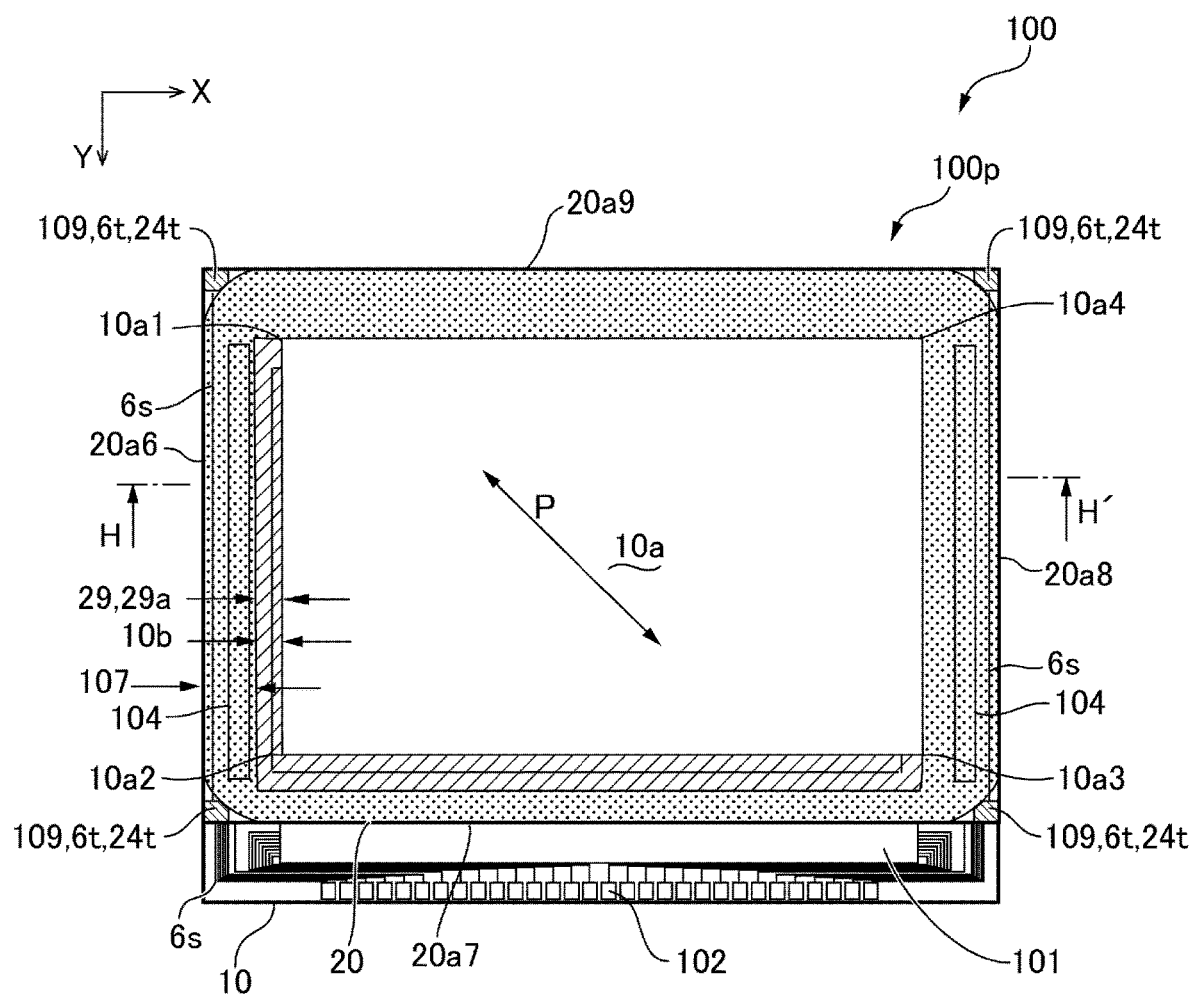
FIG. 1 is a plan view illustrating a configuration example of a liquid crystal apparatus according to exemplary embodiment 1 of the present disclosure.

Exemplary embodiments of the disclosure will be described below with reference to the drawings. Note that, in each of the drawings referenced in the following description, each layer, each member, and the like are illustrated at a different scale to illustrate each layer, each member, and the like in a recognizable size in the drawings. Further, when a layer formed in a first substrate 10 is described, an upper layer side or a surface side means a side opposite to a side of the first substrate 10 on which a substrate main body 10w is positioned (side on which a second substrate 20 and a liquid crystal 50 are positioned), and a lower layer side means a side of the first substrate 10 on which the substrate main body 10w is positioned. When a layer formed in the second substrate 20 is described, an upper layer side or a surface side means a side opposite to a side of the second substrate 20 on which a substrate main body 20w is positioned (side on which the first substrate 10 and the liquid crystal 50 are positioned), and a lower layer side means a side of the second substrate 20 on which the substrate main body 20w is positioned.

Exemplary Embodiment 1

Figure 2:
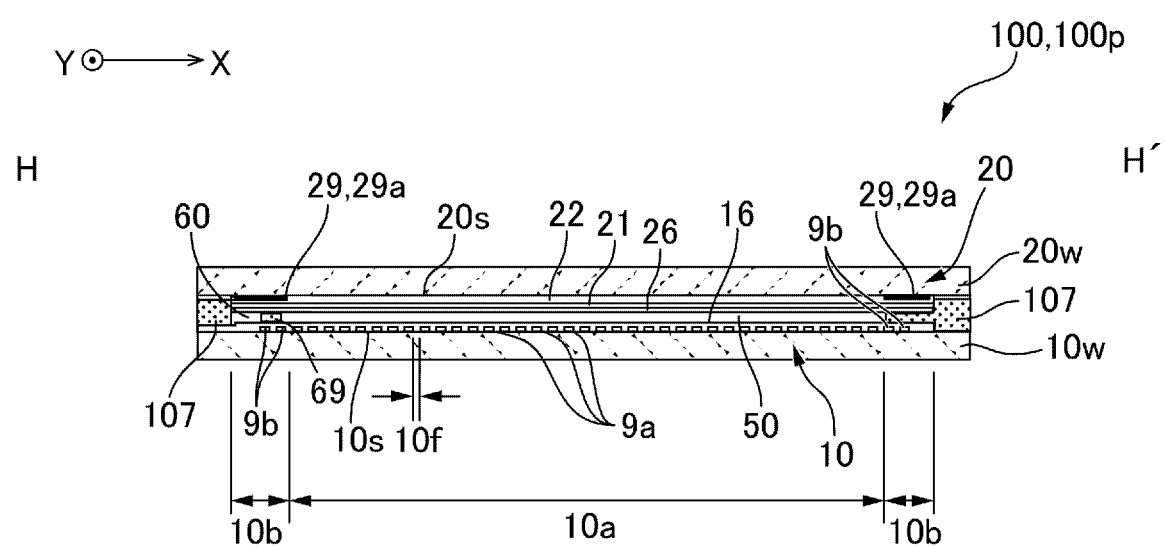
FIG. 2 is an H-H' cross-sectional view of the liquid crystal apparatus illustrated in FIG. 1.

Overall Configuration of Liquid Crystal Apparatus 100
FIG. 1 is a plan view illustrating a configuration example of a liquid crystal apparatus 100 according to exemplary embodiment 1 of the present disclosure. FIG. 2 is an H-H' cross-sectional view of the liquid crystal apparatus 100 illustrated in FIG. 1. The liquid crystal apparatus 100 illustrated in FIG. 1 and FIG. 2 includes a liquid crystal panel 100p. In the liquid crystal apparatus 100, a pair of substrates composed of the first substrate 10 (element substrate) and the second substrate 20 (counter substrate) are bonded together by a seal material 107 via a predetermined gap, and the seal material 107 is provided in a frame shape along an outer edge of the second substrate 20. The seal material 107 is an adhesive composed of a photocurable resin, a thermosetting resin, or the like. The seal material 107 may include a gap material (not illustrated) such as glass fiber or glass beads compounded to set a distance between the pair of substrates to a predetermined value. In the liquid crystal apparatus 100, the liquid crystal 50 is provided in a region surrounded by the seal material 107 between the first substrate 10 and the second substrate 20. In the seal material 107, a cut portion (not illustrated) used as a liquid crystal injection port may be formed and, in such a case, the cut portion is sealed by a sealing material after the liquid crystal 50 is injected.

In the liquid crystal apparatus 100, the first substrate 10 and the second substrate 20 each have a quadrangular shape, and in a substantially central portion of the liquid crystal apparatus 100, a display area 10a is provided as a quadrangular region. In accordance with such a shape, the seal material 107 is also provided in a substantially quadrangular frame shape, and an outer side of the display area 10a is an outer peripheral area having a substantially quadrangular frame shape. In the exemplary embodiment, the display area 10a, the first substrate 10, and the second substrate 20 all have rectangular shapes with long sides extending in the X direction.

On a side on which the first substrate 10 protrudes from the second substrate 20 on the outer side of the display area 10a in the first substrate 10, a data line driving circuit 101 and a plurality of terminals 102 are formed along one side of the first substrate 10, and a scanning line driving circuit 104 is formed along each of other sides adjacent to the one side of the first substrate 10. The terminals 102 are provided on an outer peripheral side of the seal material 107. A flexible wiring substrate (not illustrated) is coupled to the terminals 102, and various potentials and various signals are input to the first substrate 10 via the flexible wiring substrate. In the exemplary embodiment, the data line driving circuit 101 and the scanning line driving circuit 104 overlap the seal material 107 in plan view.

The first substrate 10 includes the substrate main body 10w having light transmissivity, such as a quartz substrate or a glass substrate, and, on the side of a first surface 10s of the first substrate 10 (substrate main body 10w) facing the second substrate 20, a plurality of pixel switching elements and a plurality of pixel electrodes 9a are formed in a matrix pattern in the pixel area 10a. The plurality of pixel electrodes 9a are each electrically coupled to a corresponding pixel switching element within the plurality of pixel switching elements. A first alignment film 16 is formed on the upper layer side of the pixel electrodes 9a.

On the side of the first surface 10s of the first substrate 10, dummy pixel electrodes 9b formed simultaneously with the pixel electrodes 9a are formed in a peripheral area 10b having a quadrangular frame shape and sandwiched between the display area 10a and the seal material 107. While, in FIG. 2, two rows of dummy pixel electrodes 9b are depicted per side, the dummy pixel electrodes 9b may be formed in one row or three rows or more.

The second substrate 20 includes the substrate main body 20w having light transmissivity, such as a quartz substrate or a glass substrate and, on the side of a first surface 20s of the second substrate 20 (substrate main body 20w) facing the first substrate 10, a common electrode 21 is formed. The common electrode 21 is formed entirely at the second substrate 20. On the side of the first surface 20s of the second substrate 20, a light-shielding layer 29 is formed on the lower layer side of the common electrode 21, and a second alignment film 26 is laminated on a surface of the common electrode 21 on the liquid crystal 50 side. An insulating film 22 having light transmissivity is formed between the light-shielding layer 29 and the common electrode 21. The light-shielding layer 29 is formed as a frame portion 29a extending along an outer peripheral edge of the display area 10a, and an outer edge of the display area 10a is defined by an inner edge of the frame portion 29a. The frame portion 29a is formed at a position that overlaps the dummy pixel electrodes 9b in a planar manner. The light-shielding layer 29 may be formed to include a black matrix portion (not illustrated) overlapping inter-pixel areas 10f, each sandwiched between the pixel electrodes 9a adjacent to each other. Further, a lens that overlaps, in plan view, the plurality of pixel electrodes 9a may be formed in the second substrate 20.

In the liquid crystal apparatus 100, outside of the seal material 107, inter-substrate conduction electrode portions 24t composed of a portion of the common electrode 21 are formed at four corner sections on the side of the first surface 20s of the second substrate 20 and, on the side of the first surface 10s of the first substrate 10, inter-substrate conduction electrode portions 6t are formed at positions facing the four corner sections (inter-substrate conduction electrode portions 24t) of the second substrate 20. The inter-substrate conduction electrode portions 6t are conductively connected to a constant potential wiring line 6s to which a common potential Vcom is applied, and the constant potential wiring line 6s is conductively connected to, from among the plurality of terminals 102, a terminal 102a for common potential application. Inter-substrate conduction materials 109 including conductive particles are disposed between the inter-substrate conduction electrode portions 6t and the inter-substrate conduction electrode portions 24t, and the common electrode 21 of the second substrate 20 is electrically coupled to the first substrate 10 side via the inter-substrate conduction electrode portions 6t, the inter-substrate conduction materials 109, and the inter-substrate conduction electrode portions 24t. Thus, the common potential Vcom is applied to the common electrode 21 from the side of the first substrate 10.

The liquid crystal apparatus 100 of the exemplary embodiment is a transmissive type liquid crystal apparatus. Accordingly, the pixel electrodes 9a and the common electrode 21 are each formed of a transmissive conductive film, such as an indium tin oxide (ITO) film and an indium zinc oxide (IZO) film. In the transmissive type liquid crystal apparatus 100, for example, light incident from the side of the second substrate 20 is emitted from the first substrate 10, during which the light is modulated so that an image is displayed. Note that when the common electrode 21 is formed by a transmissive conductive film and the pixel electrodes 9a are reflective electrodes, the liquid crystal apparatus 100 is configured as a reflective type liquid crystal apparatus. In the reflective type liquid crystal apparatus 100, light incident from the side of the second substrate 20 is reflected at the pixel electrodes 9a of the first substrate 10 and is emitted from the second substrate 20 again, during which the light is modulated so that an image is displayed.

The liquid crystal apparatus 100 may be used as a color display apparatus of an electronic device such as a mobile computer or a mobile phone, and in this case, a color filter (not illustrated) is formed on the first substrate 10 or the second substrate 20. Further, the liquid crystal apparatus 100 may be used as a light valve of RGB in a projection-type display apparatus (liquid crystal projector) described later. In this case, for example, light of each color decomposed through a dichroic mirror for RGB color decomposition is incident as projection light on each of the liquid crystal apparatuses 100 for RGB and thus, a color filter is not formed.

Specific Configuration of Pixel 100a

Figure 3:
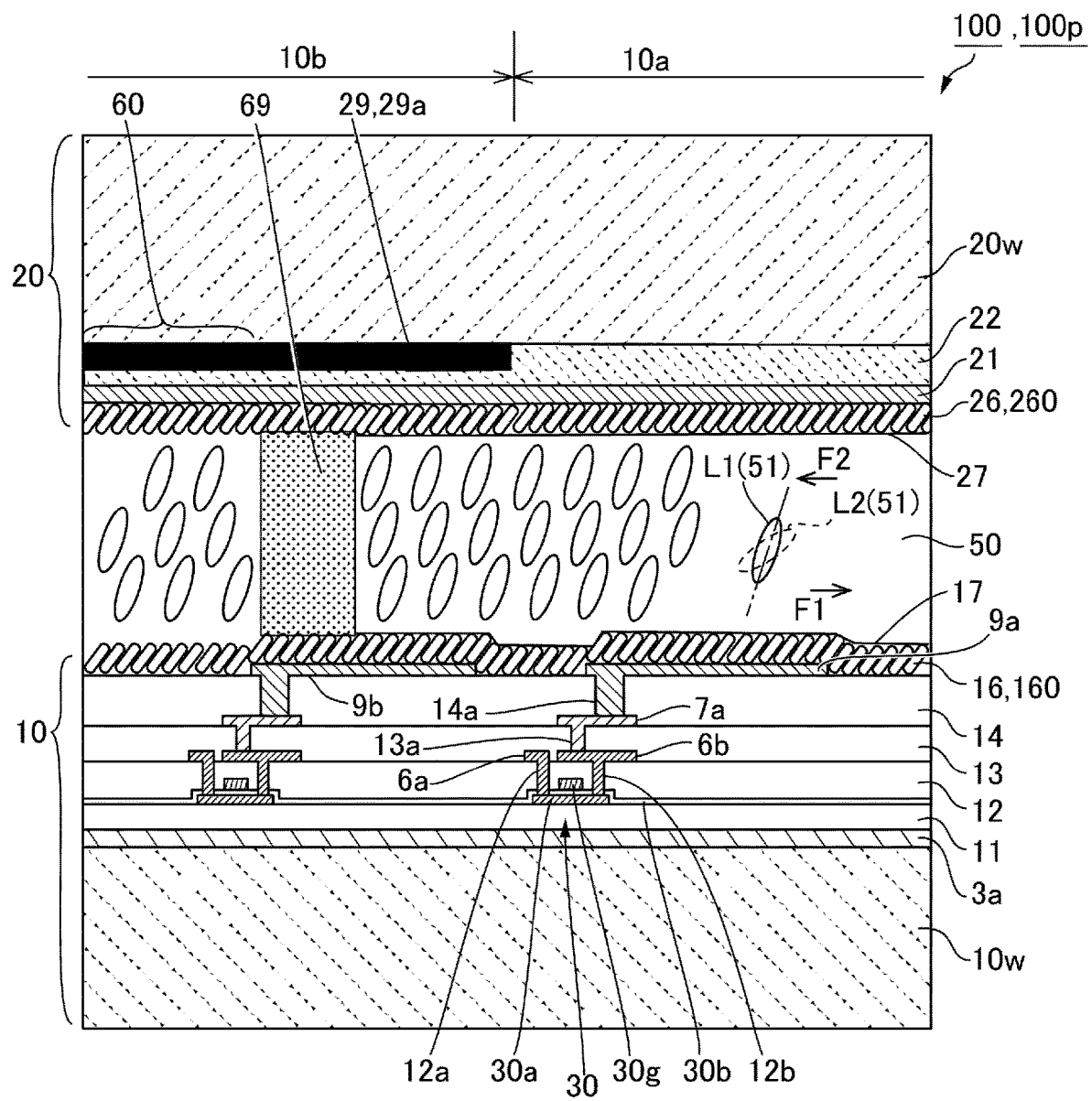
FIG. 3 is a cross-sectional view schematically illustrating a specific configuration example of pixels and the like of the liquid crystal apparatus illustrated in FIG. 1.

FIG. 3 is a cross-sectional view schematically illustrating a specific configuration example of pixels and the like of the liquid crystal apparatus 100 illustrated in FIG. 1. As illustrated in FIG. 3, a scanning line 3a composed of a conductive film such as a conductive polysilicon film, a metal silicide film, a metal film, or a metal compound film is formed on the first surface 10s side of the first substrate 10. In the exemplary embodiment, the scanning line 3a is composed of a light-shielding film of tungsten silicide (WSi) or the like. An insulating film 11 having light transmissivity is formed on the upper layer side of the scanning line 3a, and a pixel switching element 30 including a semiconductor layer 30a is formed on a surface side of such an insulating film 11. In the exemplary embodiment, the insulating film 11 is composed of a silicon oxide film or the like.

The pixel switching element 30 includes the semiconductor layer 30a, and a gate electrode 30g intersecting the semiconductor layer 30a, and includes a gate insulation layer 30b having light transmissivity between the semiconductor layer 30a and the gate electrode 30g. The semiconductor layer 30a includes a polysilicon film (polycrystalline silicon film) or the like. The gate insulation layer 30b has a two-layer structure including a gate insulation layer composed of a silicon oxide film obtained by thermally oxidizing the semiconductor layer 30a, and a second gate insulation layer composed of a silicon oxide film formed by a low-pressure chemical vapor deposition (CVD) method or the like. The gate electrode 30g is electrically coupled, via a contact hole (not illustrated) passing through the gate insulation layer 30b and the insulating film 11, to the scanning line 3a.

Interlayer insulating films 12, 13, 14 having light transmissivity and each composed of a silicon oxide film or the like are formed in this order on the upper layer side of the gate electrode 30g, and a retention capacitor (not illustrated) is constituted by utilizing spaces among the interlayer insulating films 12, 13, 14, and the like. A data line 6a and a drain electrode 6b are formed between the interlayer insulating film 12 and the interlayer insulating film 13, and a relay electrode 7a is formed between the interlayer insulating film 13 and the interlayer insulating film 14. The data line 6a is electrically coupled to a source area of the semiconductor layer 30a via a contact hole 12a passing through the interlayer insulating film 12 and the gate insulating layer 30b. The drain electrode 6b is electrically coupled to a drain area of the semiconductor layer 30a via a contact hole 12b passing through the interlayer insulating film 12 and the gate insulating layer 30b. The relay electrode 7a is electrically coupled to the drain electrode 6b via a contact hole 13a passing through the interlayer insulating film 13. A surface of the interlayer insulating film 14 is a flat face, and each pixel electrode 9a is formed on the surface side of the interlayer insulating film (face side on a side of the liquid crystal 50). The pixel electrode 9a is conductively connected to the relay electrode 7a via a contact hole 14a passing through the interlayer insulating film 14. Accordingly, the pixel electrode 9a is electrically coupled to a drain area of the pixel switching element 30 via the relay electrode 7a and the drain electrode 6b.

The first alignment film 16 and the second alignment film 26 are each an inorganic alignment film composed of an obliquely deposited film of a silicon oxide film ($SiO_x (x \leq 2)$), a titanium oxide film ($TiO_2$), a magnesium oxide film (MgO), or an aluminum oxide film ($Al_2O_3$ or the like). Accordingly, in the first alignment film 16 and the second alignment film 26, columnar structures 160, 260 (columns)

are obliquely inclined from the normal direction relative to the first surfaces 10s, 20s of the first substrate 10 and the second substrate 20. Alignment regulating forces of the first alignment film 16 and the second alignment film 26 are anti-parallel. Accordingly, the first alignment film 16 and the second alignment film 26 cause nematic liquid crystal molecules (liquid crystal molecules 51), which have negative dielectric anisotropy and are used in the liquid crystal 50, to be aligned in an obliquely inclined manner relative to the first substrate 10 and the second substrate 20, thereby causing the liquid crystal molecules 51 to be pre-tilted, as indicated by a solid line L1. In the exemplary embodiment, the first alignment film 16 or the second alignment film 26 aligns the liquid crystal molecules 51 in a direction that forms an angle of 45 degrees or 135 degrees relative to a plurality of sides that define the outer edge of the display area 10a, as indicated by an arrow P in FIG. 1, for example. Accordingly, the liquid crystal molecules 51 are aligned in a direction along a diagonal line connecting, from among the four corners of the display area 10a (a first corner 10a1, a second corner 10a2, a third corner 10a3, and a fourth corner 10a4), the first corner 10a1 and the third corner 10a3 positioned diagonally. In this way, the liquid crystal apparatus 100 is configured as a liquid crystal apparatus of a normally black vertical alignment (VA) mode. Note that, of the liquid crystal molecules 51, the liquid crystal molecules 51 positioned near the first substrate 10 and the second substrate 20 are each held by the first alignment film 16 or the second alignment film 26. In the exemplary embodiment, from among a plurality of sides 20a6, 20a7, 20a8, and 20a9 that define an outer edge of one substrate (for example, the second substrate 20) of the pair of substrates, the first side 20a6 and the third side 20a8 correspond to short sides, and the second side 20a7 and the fourth side 20a9 correspond to long sides.

Configuration of Circulation Flow Path 60

Figure 4:
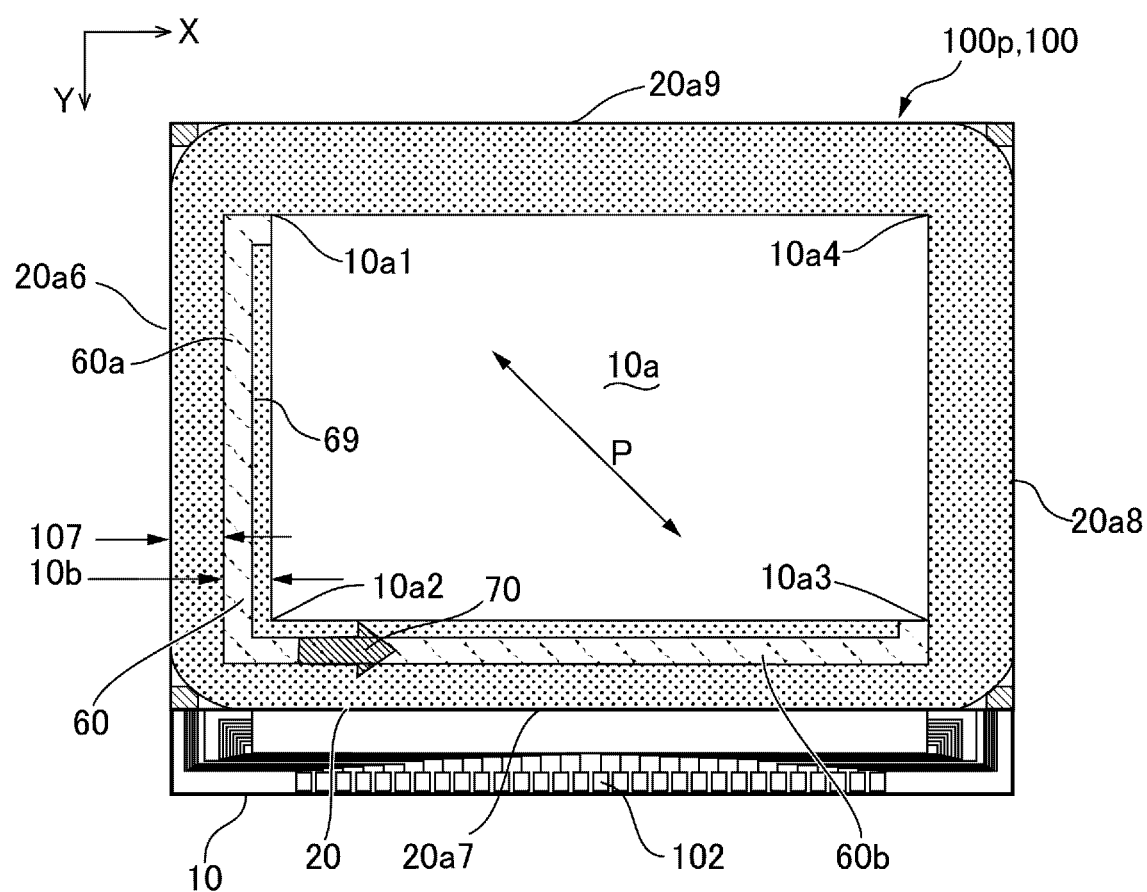
FIG. 4 is an explanatory view schematically illustrating a planar configuration of a circulation flow path provided to the liquid crystal apparatus illustrated in FIG. 1.

FIG. 4 is an explanatory view schematically illustrating a planar configuration of a circulation flow path 60 provided to the liquid crystal apparatus 100 illustrated in FIG. 1. As illustrated in FIG. 4, in the liquid crystal apparatus 100 of the exemplary embodiment, the circulation flow path 60 configured to cause the liquid crystal 50 to flow is provided between the seal material 107 and a partition 69 extending along the display area 10a, between the seal material 107 and the display area 10a. In the exemplary embodiment, when the seal material 107 is provided, the partition 69 is simultaneously formed by the seal material. As a result, the first substrate 10 and the second substrate 20 are adhered by the partition 69 as well.

In the exemplary embodiment, the circulation flow path 60 extends continuously along two adjacent sides (the first side 20a6 and the second side 20a7) from among the plurality of sides 20a6, 20a7, 20a8, and 20a9 that define the outer edge of one substrate (for example, the second substrate 20) of the pair of substrates. More specifically, the circulation flow path 60 includes a first flow channel 60a extending along the first side 20a6 and a second flow path 60b extending from an end portion of the first flow channel 60a along the second side 20a7. The partition 69 is not formed on the outer side of the first corner 10a1 or the outer side of the third corner 10a3 of the display area 10a. As a result, an end portion of the first flow path 60a on a side opposite to the second flow path 60b connects with the display area 10a at the first corner 10a1 of the display area 10a, and an end portion of the second flow path 60b on a side opposite to the first flow path 60a connects with the display area 10a at the third corner 10a3 of the display area 10a.

In the exemplary embodiment, as illustrated in FIG. 3, a gap between the pair of substrates (the first substrate 10 and the second substrate 20) in the circulation flow path 60 is equal to a gap between the pair of substrates (the first substrate 10 and the second substrate 20) in the display area 10a.

Configuration of Forced Circulation Apparatus 70

Figure 5:
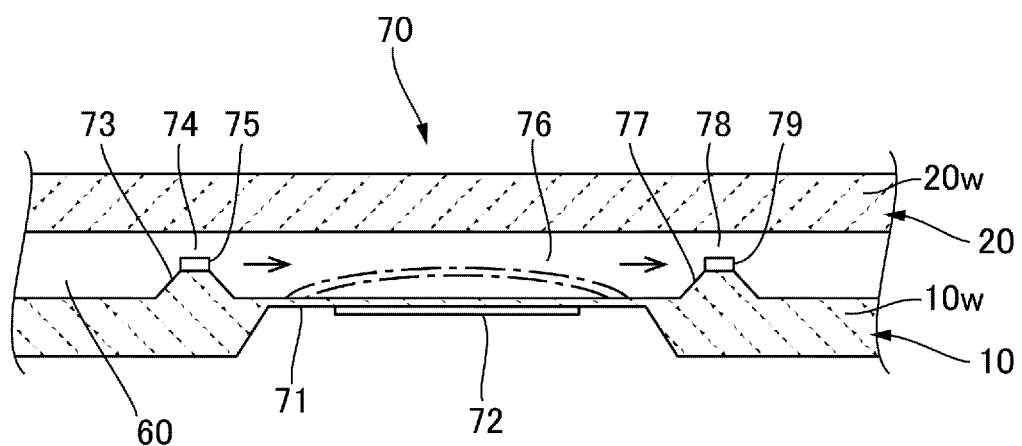
FIG. 5 is a cross-sectional view of a forced circulation apparatus illustrated in FIG. 4.

FIG. 5 is a cross-sectional view of a forced circulation apparatus 70 illustrated in FIG. 4. As illustrated in FIG. 4, in the liquid crystal apparatus 100 of the exemplary embodiment, the forced circulation apparatus 70 configured to forcibly cause the liquid crystal 50 in the circulation flow path 60 to flow is provided at an intermediate position of the circulation flow path 60. The forced circulation apparatus 70 is also provided at a center of the entire circulation flow path 60 in a length direction. Note that the forced circulation apparatus 70 may be provided at a center of the first flow path 60a or at a center of the second flow path 60b.

As illustrated in FIG. 5, the forced circulation apparatus 70 is, for example, a piezoelectric element pump provided with a piezoelectric element 72, and the piezoelectric element 72 is mounted on an outer surface of a vibrating plate 71 in which a portion of the first substrate 10 corresponding to the circulation flow path 60 is made thinner. The piezoelectric element 72 is formed by sandwiching a piezoelectric material composed of lead zirconate titanate (PZT) or the like between a pair of electrodes. A protrusion 73 is formed upstream of the vibrating plate 71 in the circulation flow path 60, and a drawing port 74 of the liquid crystal 50 is formed between the protrusion 73 and the first substrate 10. A protrusion 77 is also formed downstream of the vibrating plate 71 in the circulation flow path 60, and an area between the protrusion 77 and the first substrate 10 is established as an ejection port 78 of the liquid crystal 50. A pressure chamber 76 in which the vibrating plate 71 serves as a partition is formed between the drawing port 74 and the ejection port 78. A conductive layer 75 is formed on a tip end of the protrusion 73, and a conductive layer 79 is also formed on a tip end of the protrusion 77.

In FIG. 5, when a voltage is applied to the piezoelectric element 72, the piezoelectric element 72 expands and deforms. As a result, as indicated by the dot-dash line in FIG. 5, the vibrating plate 71 bends and deforms toward the circulation flow path 60, and a pressure in the pressure chamber 76 increases. Further, the conductive layer 79 of the ejection port 78 is energized at the same time as the piezoelectric element 72 is energized. Then, Joule heat is generated due to an internal resistance of the conductive layer 79, and a periphery of the ejection port 78 is heated. As a result, a viscosity of the liquid crystal at the ejection port 78 is lower than that at the drawing port 74, and thus a flow resistance of the liquid crystal at the ejection port 78 is lower than that at the drawing port 74. Accordingly, the liquid crystal in the pressure chamber 76 flows out through the ejection port 78.

Next, when the application of voltage to the piezoelectric element 72 is stopped, the piezoelectric element 72 returns to its original shape, as indicated by the solid line in FIG. 5. As a result, the vibrating plate 71 also returns to its original shape, and the pressure in the pressure chamber 76 decreases. Further, the conductive layer 75 of the drawing port 74 is energized at the same time as the energization of the piezoelectric element 72 is stopped, thereby heating a periphery of the drawing port 74. As a result, the viscosity of the liquid crystal at the drawing port 74 is lower than that at the ejection port 78, and thus the flow resistance of the liquid crystal at the drawing port 74 is lower than that at the ejection port 78. Accordingly, the liquid crystal flows into the pressure chamber 76 through the drawing port 74.

Therefore, by repeating the application and stopping of voltage to the piezoelectric element 72, it is possible to forcibly cause the liquid crystal 50 in the circulation flow path 60 to flow in a predetermined direction.

Note that, even when a reverse voltage is applied to the piezoelectric element 72 instead of stopping the application of voltage to the piezoelectric element 72, the operation is substantially the same as described above. Further, instead of heating the drawing port 74 or the ejection port 78 to change the viscosity of the liquid crystal 50, the liquid crystal 50 may be driven to change in viscosity at the drawing port 74 or the ejection port 78. More specifically, when an electric field is applied between the conductive layers 75, 79 and the common electrode 21, the liquid crystal 50 is aligned in accordance with the electric field and the viscosity of the liquid crystal changes, and thus such a change in viscosity may be utilized to draw the liquid crystal 50 at the drawing port 74 and eject the liquid crystal 50 at the ejection port 78.

Ion Adsorptivity

In the exemplary embodiment, the circulation flow path 60 has a higher adsorptivity for ions than the display area 10*a*. More specifically, a surface of the circulation flow path 60 has a higher adsorptivity for ions than surfaces of portions of the first substrate 10 and the second substrate 20 corresponding to the display area 10*a*. In the exemplary embodiment, in the first substrate 10, from among the first alignment film 16 provided to the display area 10*a* and the first alignment film 16 provided to the circulation flow path 60, an organic silane compound layer 17 having hydrophobicity is provided to a surface of the first alignment film 16 provided to the display area 10*a*. Further, in the second substrate 20, from among the second alignment film 26 provided to the display area 10*a* and the second alignment film 26 provided to the circulation flow path 60, an organic silane compound layer 27 having hydrophobicity is provided to a surface of the second alignment film 26 provided to the display area 10*a*. As a result, the silanol groups of the first alignment film 16 and the second alignment film 26 and the liquid crystal 50 are not in contact with each other. Therefore, a photochemical reaction is unlikely to occur between the silanol groups of the first alignment film 16 and the second alignment film 26 and the liquid crystal 50, and thus deterioration of the liquid crystal 50 can be suppressed.

In contrast, the organic silane compound layers 17, 27 are not provided to a surface of the first alignment film 16 or a surface of the second alignment film 26 provided to the circulation flow path 60. For example, either no organic silane compound layer or an organic silane compound layer having a lower hydrophobicity than those of the organic silane compound layers 17, 27 is provided to the surface of the first alignment film 16 and the surface of the second alignment film 26 provided to the circulation flow path 60. Accordingly, the first alignment film 16 and the second alignment film 26 of the circulation flow path 60 have a higher adsorptivity for ions than the first alignment film 16 and the second alignment film 26 of the display area 10*a* throughout the circulation flow path 60. In such a configuration as well, because the circulation flow path 60 overlaps the light-shielding layer 29 (frame portion 29*a*), strong light does not reach the liquid crystal 50 in the circulation flow path 60. Accordingly, in the circulation flow path 60, a photochemical reaction is unlikely to occur between the silanol groups of the first alignment film 16 and the second alignment film 26 and the liquid crystal 50.

The imparting of hydrophobicity to the surface of the first alignment film 16 and the surface of the second alignment film 26 can be achieved by, for example, coupling the organic silane compound layers 17, 27 to the hydroxyl group (—OH) portion by a silane coupling agent such as an organic siloxane. The silane coupling agent used here produces silanol (Si—OH) by hydrolysis, and subsequently the silanol gradually condenses to produce siloxane bonds (Si—O—Si) and form the organic silane compound layers 17, 27. Further, the silane coupling agent produces a strong bond with the inorganic oxide surfaces of the first alignment film 16 and the second alignment film 26, and forms a self-organizing monomolecular film. Examples of the silane coupling agent include n-hexyltrimethoxysilane, n-hexyltriethoxysilane, cyclohexylmethyldimethoxysilane, n-octyltriethoxysilane, n-decyltrimethoxysilane, and the like. Furthermore, as the silane coupling agent, an agent containing a fluorine atom (F) in a hydrophobic organic functional group can be used.

Further, after the organic silane compound layers 17, 27 are formed on the entire surface of the first alignment film 16 and the entire surface of the second alignment film 26, by forming energy light such as ultraviolet light (UV) on the organic silane compound layers 17, 27 formed in the circulation flow path 60 and decomposing the organic silane compound layers 17, 27, it is possible to reduce the hydrophobicity. As a result, the adsorptivity for ions of first alignment film 16 and the second alignment film 26 of the circulation flow path 60 can be increased further than those of the first alignment film 16 and the second alignment film 26 in the display area 10*a*.

Main Effects of Exemplary Embodiment

In the liquid crystal apparatus 100 of the exemplary embodiment, the circulation flow path 60 is provided to the peripheral area 10*b* sandwiched between the display area 10*a* and the seal material 107, and thus it is possible to increase a filled amount of the liquid crystal 50. Further, the liquid crystal 50 can circulate through the circulation flow path 60 by natural convection. For example, when the liquid crystal apparatus 100 is mounted on a projection-type display apparatus or the like described later and the fourth side 20*a*9 is upward, the liquid crystal 50 of the display area 10*a* is heated when strong light from the light source is incident on the display area 10*a*. The heated liquid crystal 50 decreases in specific gravity and thus moves above the display area 10*a* and flows out the first corner 10*a*1 to the circulation flow path 60. The circulation flow path 60 is shielded by the light-shielding layer 29, and thus the light source light is not incident on the circulation flow path 60, and the liquid crystal 50 in the circulation flow path 60 is cooled. The cooled liquid crystal 50 increases in specific gravity and thus descends in the circulation flow path 60 and flows from the third corner 10*a*3 into the display area 10*a*. In this way, the liquid crystal 50 can be naturally convected through the circulation flow path 60.

Further, when the liquid crystal apparatus 100 is driven, in the liquid crystal 50, the liquid crystal molecules 51 switch posture as indicated by the solid line L1 and a dotted line L2 in FIG. 3. Accordingly, in the liquid crystal 50, the flow of the liquid crystal 50 occurs near the first substrate 10 and near the second substrate 20 as indicated by arrows F1, F2. Accordingly, the liquid crystal 50 circulates by, for example, flowing out the display area 10*a* to the circulation flow path 60 at the first corner 10*a*1, and flowing from the circulation flow path 60 into the display area 10*a* at the third corner 10*a*3, and the like.

Furthermore, in the exemplary embodiment, because the forced circulation apparatus 70 is provided, the liquid crystal 50 in the display area 10a is forcibly drawn from the first corner 10a1 into the circulation flow path 60, and the liquid crystal 50 is forcibly ejected from the circulation flow path 60 into the display area 10a at the third corner 10a3, by the forced circulation apparatus 70.

Therefore, in the display area 10a, even in a case in which the liquid crystal 50 has deteriorated by a photochemical reaction caused by light from a light source, the time until the entire liquid crystal 50 of the display area 10a deteriorates can be extended. Note that the circulation of the liquid crystal 50 by the driving of the forced circulation apparatus 70 may be performed continuously or may be performed intermittently during use of an electronic device such as a projection-type display apparatus described later. Further, the driving may be performed for just a certain period during startup or shutdown of the electronic device.

Further, because the circulation flow path 60 has a higher adsorptivity for ions than the display area 10a, ionic impurities are removed from the liquid crystal 50 in the circulation flow path 60. As a result, a concentration of ionic impurities can be lowered for the liquid crystal 50 flowing into the display area 10a from the circulation flow path 60, and thus the concentration of ionic impurities in the liquid crystal 50 of the display area 10a can be kept low. Accordingly, when an image is displayed, display irregularities such as spots caused by aggregation of ionic impurities at the corners of the display area 10a are less likely to occur.

Further, while ionic impurities and the like readily aggregate at the first corner 10a1 and the third corner 10a3 where the distance of the display area 10a in the alignment direction relative to the liquid crystal 50 is long, in the exemplary embodiment, the circulation flow path 60 connects with the display area 10a at the first corner 10a1 and the third corner 10a3. Accordingly, the liquid crystal 50 having an increased concentration of ionic impurities readily flows out the display area 10a to the circulation flow path 60, and thus the ionic impurities and the like can be efficiently removed from the liquid crystal 50 by the circulation flow path 60.

Modified Example 1 of Exemplary Embodiment 1

Figure 6:
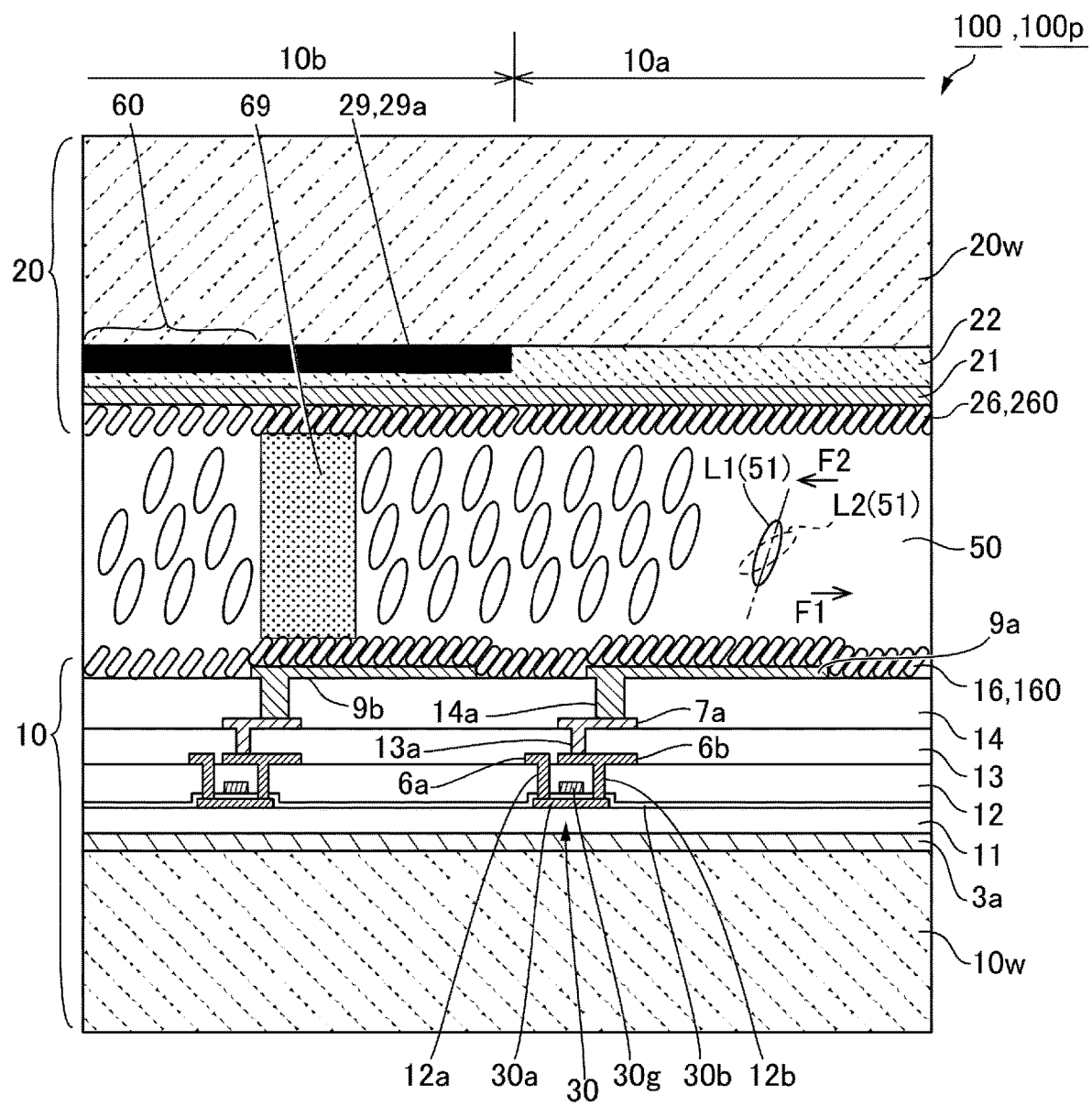
FIG. 6 is an explanatory view of the liquid crystal apparatus according to modified example 1 of exemplary embodiment 1 of the present disclosure.

FIG. 6 is an explanatory view of the liquid crystal apparatus 100 according to modified example 1 of exemplary embodiment 1 of the present disclosure and, similar to FIG. 3, is a cross-sectional view schematically illustrating a specific configuration example of a pixel 100a. Note that, since the basic configurations of this exemplary embodiment and an exemplary embodiment described later are the same as the basic configuration of exemplary embodiment 1, common constituent elements are assigned the same reference symbols and description thereof will be omitted.

In exemplary embodiment 1, to make the adsorptivity for ions of the circulation flow path 60 higher than that of the display area 10a, the hydrophobic organic silane compound layers 17, 27 are provided to only the surface of the first alignment film 16 and the second alignment film 26 of the display area 10a. In contrast, in this exemplary embodiment, as illustrated in FIG. 6, in the first substrate 10, from among the first alignment film 16 provided to the display area 10a and the first alignment film 16 provided to the circulation flow path 60, the first alignment film 16 provided to the circulation flow path 60 has a lower formation density of the columnar structure 160 than the first alignment film 16 provided to the display area 10a, and gaps are formed between the columnar structures 160 in the circulation flow path 60. As a result, the first alignment film 16 provided to the circulation flow path 60 has a larger surface area and thus a higher adsorptivity for ions than the first alignment film 16 provided to the display area 10a. Similarly, in the second substrate 20, from among the second alignment film 26 provided to the display area 10a and the second alignment film 26 provided to the circulation flow path 60, the second alignment film 26 provided to the circulation flow path 60 has a lower formation density than the second alignment film 26 provided to the display area 10a. As a result, the second alignment film 26 provided to the circulation flow path 60 has a larger surface area and thus a higher adsorptivity for ions than the second alignment film 26 provided to the display area 10a.

Such a configuration can be achieved by using a mask deposition method to change a deposition angle (angle formed between the normal direction and a vapor deposition direction relative to the substrate), a film deposition time, a vapor deposition rate, or the like in deposition conditions for the display area 10a and deposition conditions for the circulation flow path 60 when forming the first alignment film 16 and the second alignment film 26 by oblique deposition. For example, when the film is deposited on the circulation flow path 60, a condition in which the vapor deposition angle is made larger, a condition in which a film thickness is made greater, or a condition in which the film deposition rate is made lower than that when the film is deposited on the display area 10a is established. Further, the configuration described above can also be achieved by forming the film on the display area 10a by an ion assisted method, and also by performing normal electron beam (EB) vapor deposition on the circulation flow path 60. The rest of the configuration is the same as that of exemplary embodiment 1.

In such a configuration as well, similar to exemplary embodiment 1, ionic impurities can be trapped from the liquid crystal 50 flowing through the circulation flow path 60, and thus the concentration of ionic impurities in the liquid crystal 50 of the display area 10a can be kept low. Accordingly, when an image is displayed, spots caused by aggregation of ionic impurities at the corners of the display area 10a and the like are less likely to occur in the image.

Modified Example 2 of Exemplary Embodiment 1

Figure 7:
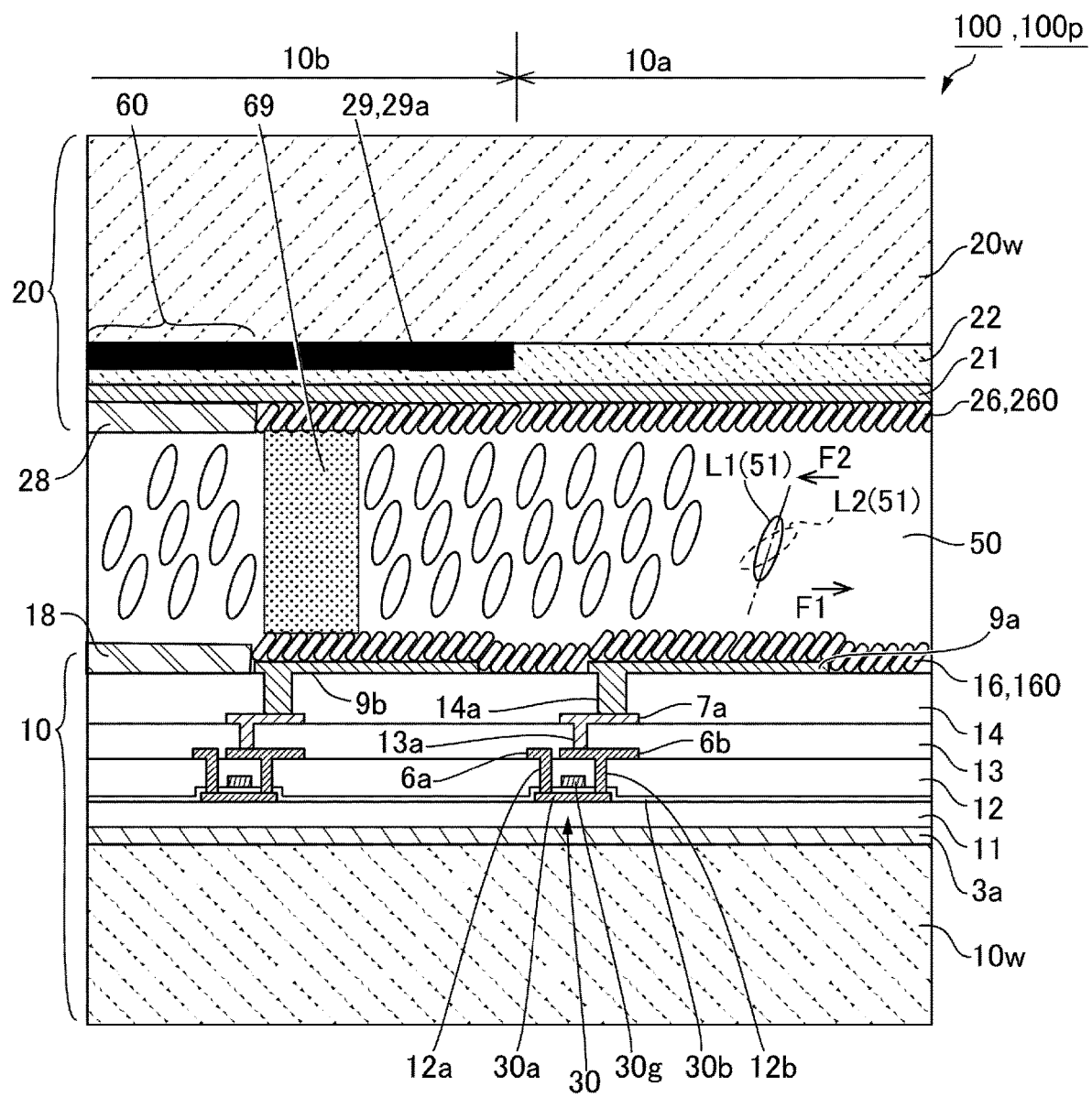
FIG. 7 is an explanatory view of the liquid crystal apparatus according to modified example 1 of exemplary embodiment 1 of the present disclosure.

FIG. 7 is an explanatory view of the liquid crystal apparatus 100 according to modified example 2 of exemplary embodiment 1 of the present disclosure and, similar to FIG. 3, is a cross-sectional view schematically illustrating a specific configuration example of the pixel 100a. In this exemplary embodiment, as illustrated in FIG. 7, in the first substrate 10, the display area 10a is provided with the first alignment film 16 while the circulation flow path 60, without being provided with the first alignment film 16, is provided with an ion adsorption layer 18 having a higher adsorptivity for ions than the first alignment film 16. Further, in the second substrate 20 as well, similar to the first substrate 10, the display area 10a is provided with the second alignment film 26 while the circulation flow path 60, without being provided with the second alignment film 26, is provided with an ion adsorption layer 28 having a higher adsorptivity for ions than the second alignment film 26. As the ion adsorption layers 18, 28, a porous layer of an inorganic material such as zeolite or silica gel, or a porous layer of an organic material such as polyimide, fluororesin, polymethacrylate, polyacrylate, polystyrene, polyethylene, or polypropylene may be used. The rest of the configuration is the same as that of exemplary embodiment 1.

In such a configuration as well, similar to exemplary embodiment 1, ionic impurities can be trapped from the liquid crystal 50 flowing through the circulation flow path 60, and thus the concentration of ionic impurities in the liquid crystal 50 of the display area 10a can be kept low. Accordingly, when an image is displayed, spots caused by aggregation of ionic impurities at the corners of the display area 10a and the like are less likely to occur in the image.

Modified Example 3 of Exemplary Embodiment 1

While, in exemplary embodiment 1, modified example 1, and modified example 2, the ion adsorptivity of a portion facing the circulation flow path 60 on both the side of the first substrate 10 and the side of the second substrate 20 was increased to make the ion adsorptivity of the circulation flow path 60 greater than the ion adsorptivity of the display area 10a, the ion adsorptivity of the portion facing the circulation flow path 60 on one of the side of the first substrate 10 and the side of the second substrate 20 may be increased.

Exemplary Embodiment 2

Figure 8:
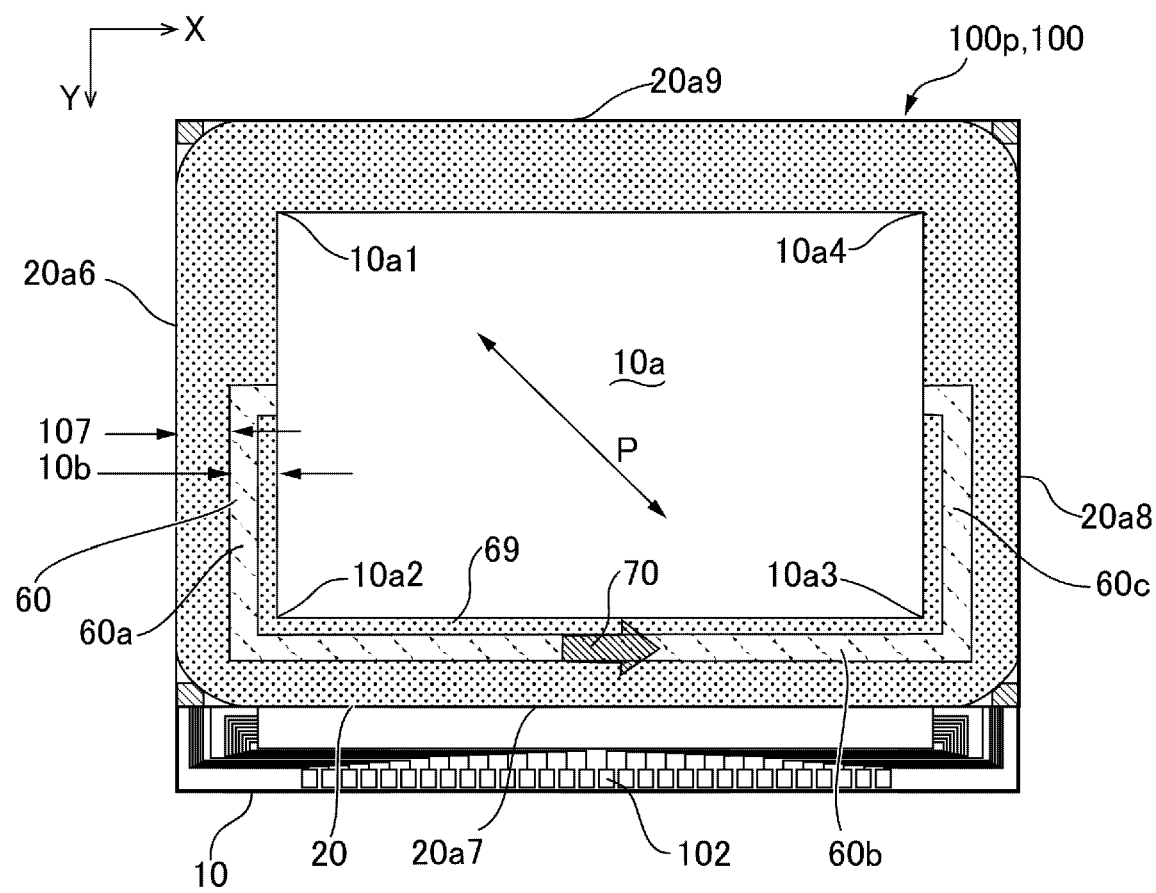
FIG. 8 is an explanatory view of the liquid crystal apparatus according to exemplary embodiment 2 of the present disclosure.

FIG. 8 is an explanatory view of the liquid crystal apparatus 100 according to exemplary embodiment 2 of the present disclosure, and is an explanatory view schematically illustrating a planar configuration of the circulation flow path 60. As illustrated in FIG. 8, in the liquid crystal apparatus 100 of this exemplary embodiment as well, similar to exemplary embodiment 1, the circulation flow path 60 configured to cause the liquid crystal 50 to flow is provided between the seal material 107 and the partition 69, between the seal material 107 and the display area 10a. The circulation flow path 60 includes, from among the plurality of sides defining the outer edge of the second substrate 20, the first flow path 60a extending along the first side 20a6, the second flow path 60b extending along the second side 20a7 adjacent to the first side 20a6, and a third flow path 60c extending along the third side 20a8 opposite to the first side 20a6. The third side 20a8 is a side adjacent to the second side 20a7. Further, the circulation flow path 60 connects with the display area 10a at portions of the display area 10a along the first side 20a6 and the third side 20a8.

More specifically, the first flow path 60a extends from the second corner 10a2 to an intermediate position of the first side 20a6, and connects with the display area 10a at an intermediate position of a portion along the first side 20a6. The third flow path 60c extends from the third corner 10a3 to an intermediate position of the third side 20a8, and connects with the display area 10a at an intermediate position of a portion along the third side 20a8. The second flow path 60b connects with the first flow path 60a on an outer side of the second corner 10a2 and connects with the third flow path 60c on an outer side of the third corner 10a3.

In this exemplary embodiment as well, similar to exemplary embodiment 1, the forced circulation apparatus 70 configured to forcibly cause the liquid crystal 50 in the circulation flow path 60 to flow is provided at an intermediate position of the circulation flow path 60. Accordingly, in the display area 10a, even in a case in which the liquid crystal 50 has deteriorated by a photochemical reaction caused by light from a light source, the time until the entire liquid crystal 50 of the display area 10a deteriorates can be extended. In the exemplary embodiment, the forced circulation apparatus 70 is provided at the center of the second flow path 60b of the second circulation flow path 60. As a result, the forced circulation apparatus 70 is provided at the center of the entire circulation flow path 60 in the length direction. Note that the forced circulation apparatus 70 may be provided to the first flow path 60a or the third flow path 60c.

Further, in this exemplary embodiment as well, similar to exemplary embodiment 1, modified example 1, and modified example 2, the circulation flow path 60 has a higher adsorptivity for ions than the display area 10a. Accordingly, similar to exemplary embodiment 1, ionic impurities can be trapped from the liquid crystal 50 flowing through the circulation flow path 60, and thus the concentration of ionic impurities in the liquid crystal 50 of the display area 10a can be kept low. Accordingly, when an image is displayed, spots caused by aggregation of ionic impurities at the corners of the display area 10a and the like are less likely to occur in the image.

Exemplary Embodiment 3

Figure 9:
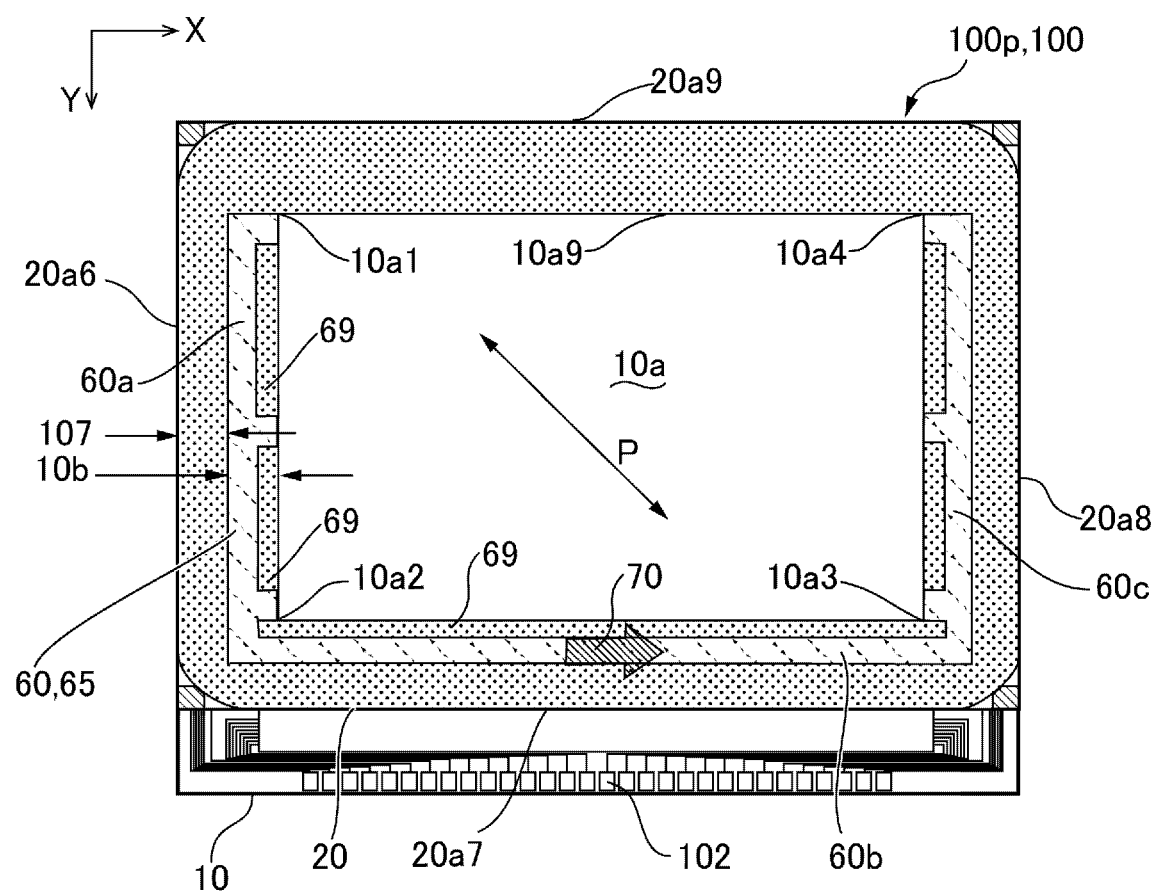
FIG. 9 is an explanatory view of the liquid crystal apparatus according to exemplary embodiment 3 of the present disclosure.

FIG. 9 is an explanatory view of the liquid crystal apparatus 100 according to exemplary embodiment 3 of the present disclosure, and is an explanatory view schematically illustrating a planar configuration of the circulation flow path 60. As illustrated in FIG. 9, in the liquid crystal apparatus 100 of this exemplary embodiment as well, similar to exemplary embodiment 1, the circulation flow path 60 configured to cause the liquid crystal 50 to flow is provided between the seal material 107 and the partition 69, between the seal material 107 and the display area 10a. The circulation flow path 60 includes, from among the plurality of sides defining the outer edge of the second substrate 20, the first flow path 60a extending along the first side 20a6, the second flow path 60b extending along the second side 20a7, and the third flow path 60c extending along the third side 20a8. Further, in this exemplary embodiment as well, similar to exemplary embodiment 1, the forced circulation apparatus 70 configured to forcibly cause the liquid crystal 50 in the circulation flow path 60 to flow is provided at an intermediate position of the circulation flow path 60. Further, in this exemplary embodiment as well, similar to exemplary embodiment 1, modified example 1, and modified example 2, the circulation flow path 60 has a higher adsorptivity for ions than the display area 10a.

In the exemplary embodiment, the first flow path 60a extends along the first side 20a6 from the second corner 10a2 to the first corner 10a1, and connects with the display area 10a at a portion along the first side 20a6. More specifically, the first flow path 60a connects with the display area 10a at the first corner 10a1, the second corner 10a2, and an intermediate position of the first side 20a6. The third flow path 60c extends along the third side 20a8 from the third corner 10a3 to the fourth corner 10a4, and connects with the display area 10a at a portion along the third side 20a8. More specifically, the third flow path 60c connects with the display area 10a at the third corner 10a3, the fourth corner 10a4, and an intermediate position of the third side 20a8. The second flow path 60b connects with the first flow path 60a on the outer side of the second corner 10a2 and connects with the third flow path 60c on the outer side of the third corner 10a3. Accordingly, outflow of the liquid crystal 50 from the display area 10a to the circulation flow path 60, and inflow of the liquid crystal 50 from the circulation flow path 60 into the display area 10*a* can be smoothly achieved.

Exemplary Embodiment 4

Figure 10:
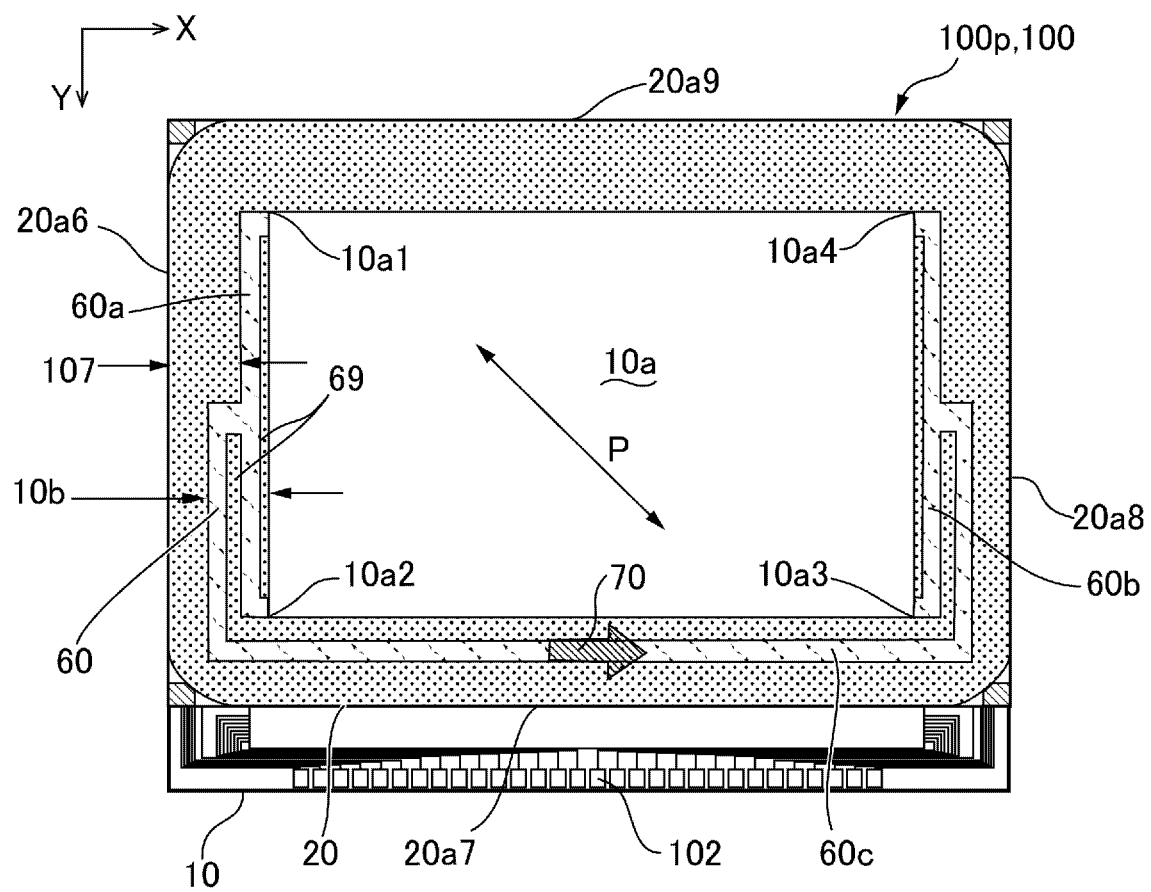
FIG. 10 is an explanatory view of the liquid crystal apparatus according to exemplary embodiment 4 of the present disclosure.

FIG. 10 is an explanatory view of the liquid crystal apparatus 100 according to exemplary embodiment 4 of the present disclosure, and is an explanatory view schematically illustrating a planar configuration of the circulation flow path 60. As illustrated in FIG. 10, in the liquid crystal apparatus 100 of this exemplary embodiment as well, similar to exemplary embodiment 1, the circulation flow path 60 configured to cause the liquid crystal 50 to flow is constituted by the seal material 107 and the partition 69, between the seal material 107 and the display area 10*a*. The circulation flow path 60 includes, from among the plurality of sides defining the outer edge of the second substrate 20, the first flow path 60*a* extending along the first side 20*a*6, the second flow path 60*b* extending along the second side 20*a*7, and the third flow path 60*c* extending along the third side 20*a*8.

In the exemplary embodiment, the first flow path 60*a* extends along the first side 20*a*6 from the second corner 10*a*2 to the first corner 10*a*1, and connects with the display area 10*a* at the first corner 10*a*1 and the second corner 10*a*2. The third flow path 60*c* extends along the third side 20*a*8 from the third corner 10*a*3 to the fourth corner 10*a*4, and connects with the display area 10*a* at the third corner 10*a*3 and the fourth corner 10*a*4. The second flow path 60*b* extends from the second side 20*a*7 to an intermediate position of the first side 20*a*6 through the second corner 10*a*2 and an outer side of the first flow channel 60*a*, and connects with an intermediate position of the first flow channel 60*a*. Further, the second flow path 60*b* extends from the second side 20*a*7 to an intermediate position of the third side 20*a*8 through the third corner 10*a*3 and an outer side of the third flow channel 60*c*, and connects with an intermediate position of the third flow channel 60*c*. Accordingly, outflow of the liquid crystal 50 from the display area 10*a* to the circulation flow path 60, and inflow of the liquid crystal 50 from the circulation flow path 60 into the display area 10*a* can be smoothly achieved.

In this exemplary embodiment as well, similar to exemplary embodiment 1, the forced circulation apparatus 70 configured to forcibly cause the liquid crystal 50 in the circulation flow path 60 to flow is provided at an intermediate position of the circulation flow path 60. Further, in this exemplary embodiment as well, similar to exemplary embodiment 1, modified example 1, and modified example 2, the circulation flow path 60 has a higher adsorptivity for ions than the display area 10*a*.

Exemplary Embodiment 5

Figure 11:
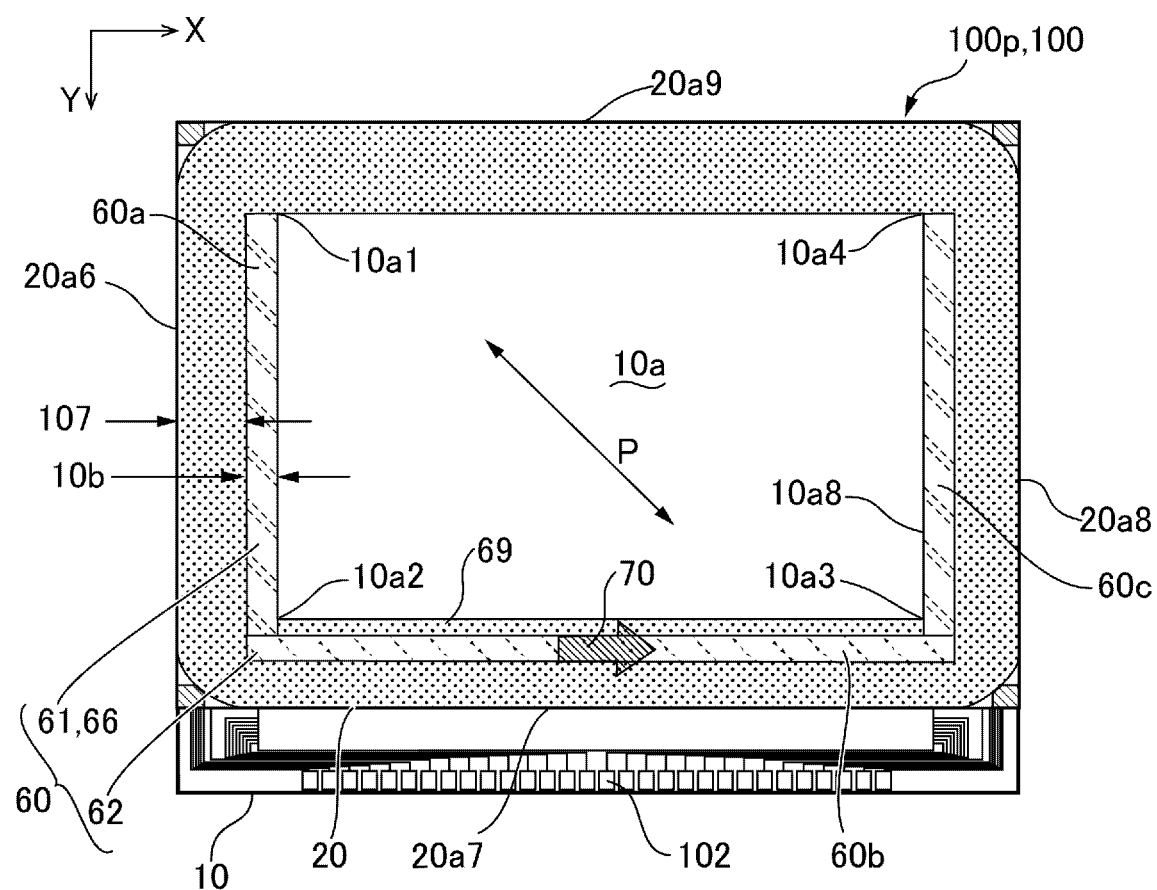
FIG. 11 is an explanatory view of the liquid crystal apparatus according to exemplary embodiment 5 of the present disclosure.
Figure 12:
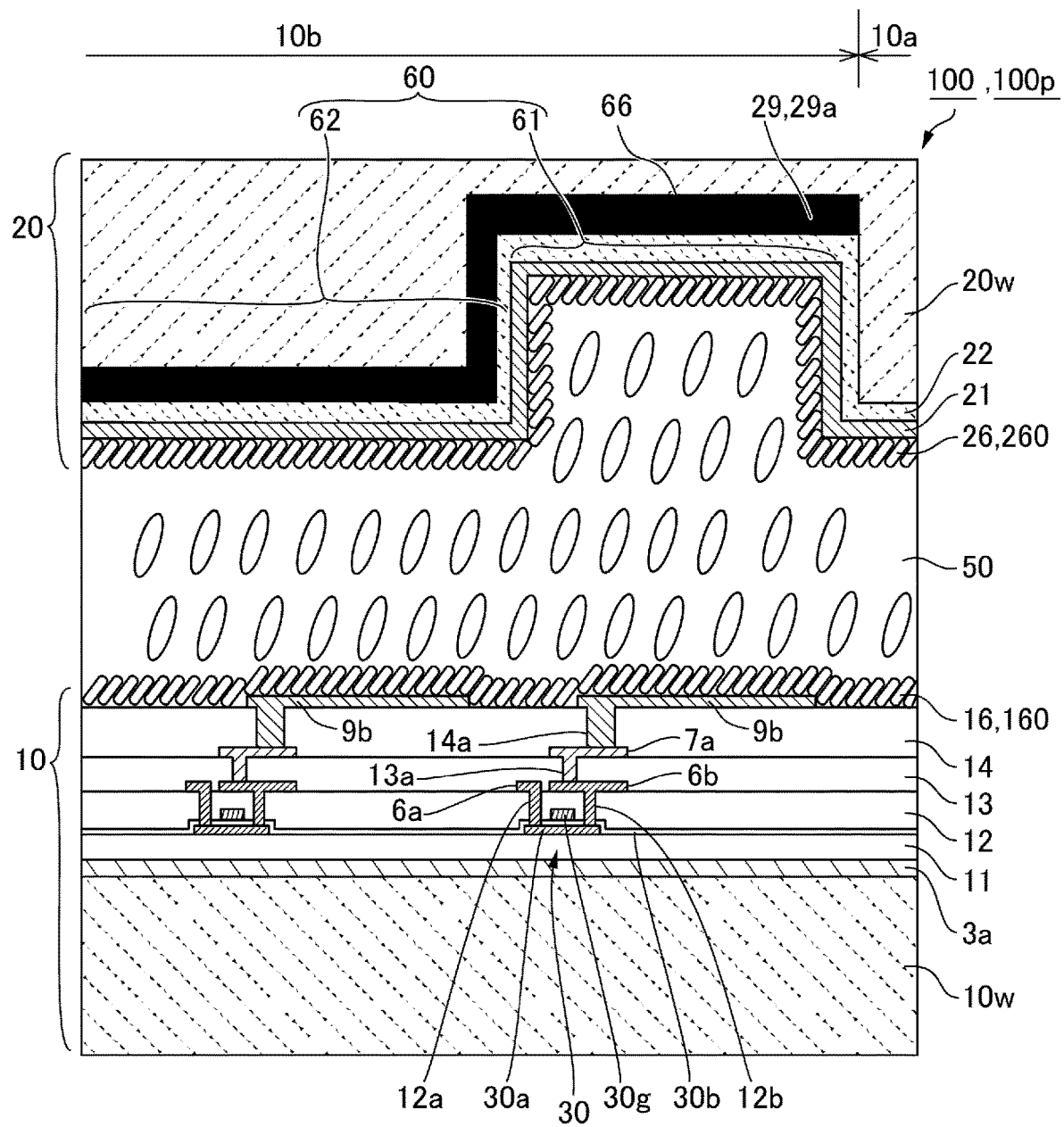
FIG. 12 is an explanatory view schematically illustrating a cross-sectional configuration of the circulation flow path illustrated in FIG. 11.

FIG. 11 is an explanatory view of the liquid crystal apparatus 100 according to exemplary embodiment 5 of the present disclosure, and is an explanatory view schematically illustrating a planar configuration of the circulation flow path 60. FIG. 12 is an explanatory view schematically illustrating a cross-sectional configuration of the circulation flow path 60 illustrated in FIG. 11. As illustrated in FIG. 11, in the liquid crystal apparatus 100 of this exemplary embodiment as well, similar to exemplary embodiment 1, the circulation flow path 60 configured to cause the liquid crystal 50 to flow is provided between the seal material 107 and the display area 10*a*. The circulation flow path 60 includes, from among the plurality of sides defining the outer edge of the second substrate 20, the first flow path 60*a* extending along the first side 20*a*6, the second flow path 60*b* extending along the second side 20*a*7, and the third flow path 60*c* extending along the third side 20*a*8.

In the exemplary embodiment, the first flow path 60*a* extends across substantially the entire portion of the display area 10*a* along the first side 20*a*6, and the third flow path 60*c* extends across substantially the entire portion of the display area 10*a* along the third side 20*a*8. The second flow path 60*b* extends along the second side 20*a*7 at a position adjacent to the display area 10*a* with the partition 69 interposed therebetween, and both ends of the second flow path 60*b* connect with an end portion of the first flow path 60*a* and an end portion of the third flow path 60*c* on the outer side of the second corner 10*a*2 and the third corner 10*a*3.

Here, the first flow path 60*a* and the third flow path 60*c* are first portions 61 extending so as to come into contact with the outer edge of the display area 10*a*, and the first flow path 60*a* and the third flow path 60*c* connect with the display area 10*a* across the entire portion along the first side 20*a*6 and the entire portion along the third side 20*a*8. In contrast, the partition 69 is provided between the second flow path 60*b* and the display area 10*a*, and the second flow path 60*b* is a second portion 62 that connects with the display area 10*a* with the first portion 61 (the first flow path 60*a* and the third flow path 60*c*) interposed therebetween.

In the exemplary embodiment, as illustrated in FIG. 12, a groove 66 corresponding to the first 61 portion is formed in the second substrate 20. As a result, the first portion 61 has a larger gap between the pair of substrates than the second portion 62, increasing a layer thickness of the liquid crystal 50. For example, the gap between the first substrate 10 and the second substrate 20 is about several μm while the gap between the first substrate 10 and the second substrate 20 in the first portion 61 of the circulation flow path 60 is increased to about several tens of μm or about several hundreds of μm. Accordingly, a cross-sectional area of the circulation flow path 60 can be increased, making it possible to increase a volume of the circulation flow path 60 and smoothly achieve outflow of the liquid crystal 50 from the display area 10*a* to the circulation flow path 60, and inflow of the liquid crystal 50 from the circulation flow path 60 into the display area 10*a*.

Further, in this exemplary embodiment as well, similar to exemplary embodiment 1, the forced circulation apparatus 70 configured to forcibly cause the liquid crystal 50 in the circulation flow path 60 to flow is provided at an intermediate position of the second portion 62 of circulation flow path 60. In the exemplary embodiment, the forced circulation apparatus 70 is provided to the second portion 62. Further, in this exemplary embodiment as well, similar to exemplary embodiment 1, modified example 1, and modified example 2, the circulation flow path 60 has a higher adsorptivity for ions than the display area 10*a*.

Exemplary Embodiment 6

Figure 13:
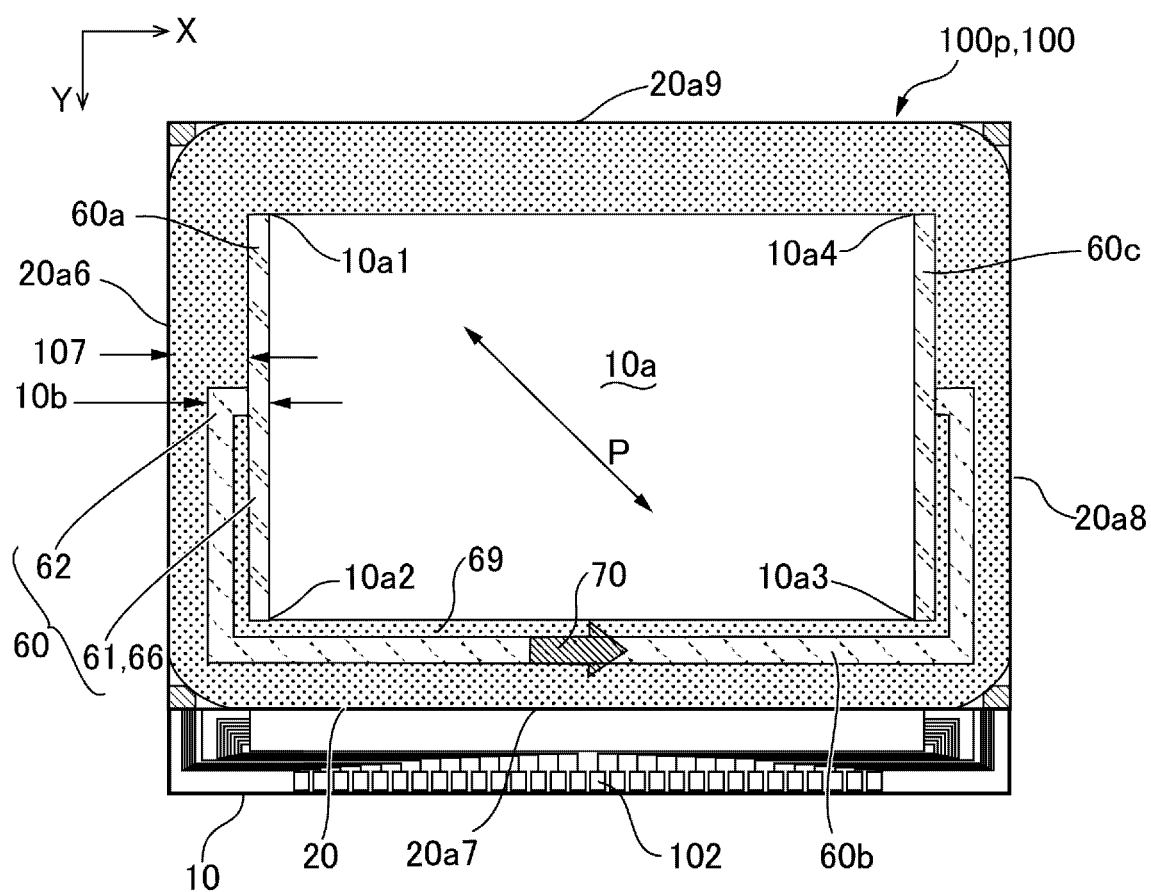
FIG. 13 is an explanatory view of the liquid crystal apparatus according to exemplary embodiment 6 of the present disclosure.

FIG. 13 is an explanatory view of the liquid crystal apparatus 100 according to exemplary embodiment 6 of the present disclosure, and is an explanatory view schematically illustrating a planar configuration of the circulation flow path 60. As illustrated in FIG. 13, in the liquid crystal apparatus 100 of this exemplary embodiment as well, similar to exemplary embodiment 1, the circulation flow path 60 configured to cause the liquid crystal 50 to flow is provided between the seal material 107 and the display area 10*a*. The circulation flow path 60 includes, from among the plurality of sides defining the outer edge of the display area 10a, the first flow path 60a extending along the first side 20a6, the second flow path 60b extending along the second side 20a7, and the third flow path 60c extending along the third side 20a8.

In the exemplary embodiment, the first flow path 60a extends across the entire portion of the display area 10a along the first side 20a6, and the third flow path 60c extends across the entire portion of the display area 10a along the third side 20a8. The first flow path 60a and the third flow path 60c are first portions 61 that extend so as to come into contact with the outer edge of the display area 10a. The second flow path 60b is the second portion 62 that connects with the display area 10a with the first portion 61 (the first flow path 60a and the third flow path 60c) interposed therebetween. More specifically, the second flow path 60b extends to an intermediate position of the first side 20a6 through the outer sides of the second corner 10a2 and the first flow channel 60a, and connects with the first flow channel 60a. Further, the second flow path 60b extends to an intermediate position of the third side 20a8 through the outer sides of the third corner 10a3 and the third flow channel 60c, and connects with the third flow channel 60c.

In this exemplary embodiment as well, as described with reference to FIG. 12 in exemplary embodiment 5, the first portion 61 has a wider gap between the pair of substrates than the second portion 62. Accordingly, outflow of the liquid crystal 50 from the display area 10a to the circulation flow path 60, and inflow of the liquid crystal 50 from the circulation flow path 60 into the display area 10a can be smoothly achieved.

Further, in this exemplary embodiment as well, similar to exemplary embodiment 1, the forced circulation apparatus 70 configured to forcibly cause the liquid crystal 50 in the circulation flow path 60 to flow is provided at an intermediate position of the second portion 62 of circulation flow path 60. In the exemplary embodiment, the forced circulation apparatus 70 is provided to the second portion 62. Further, in this exemplary embodiment as well, similar to exemplary embodiment 1, modified example 1, and modified example 2, the circulation flow path 60 has a higher adsorptivity for ions than the display area 10a.

Other Exemplary Embodiments

In exemplary embodiments 1 to 4 described above, a mode is adopted in which the gap between the pair of substrates (the first substrate 10 and the second substrate 20) in the circulation flow path 60 is equal to the gap between the pair of substrates (the first substrate 10 and the second substrate 20) in the display area 10a. However, a mode may be adopted in which a groove is formed in a portion corresponding to the circulation flow path 60 in at least one of the substrate main body 10w of the first substrate 10 and the substrate main body 20w of the second substrate 20, and the gap between the pair of substrates in the circulation flow path 60 is greater than the gap between the pair of substrates in the display area 10a as a result of the groove.

Further, in exemplary embodiments 5 and 6 described above, a mode is adopted in which the gap between the pair of substrates (the first substrate 10 and the second substrate 20) in the second portion 62 of the circulation flow path 60 is equal to the gap between the pair of substrates (the first substrate 10 and the second substrate 20) in the display area 10a. However, a mode may be adopted in which a groove is formed in a portion corresponding to the circulation flow path 60 in at least one of the substrate main body 10w of the first substrate 10 and the substrate main body 20w of the second substrate 20, and the gap between the pair of substrates in the circulation flow path 60 is greater than the gap between the pair of substrates in the display area 10a as a result of the groove. In this case as well, preferably the gap between the pair of substrates (the first substrate 10 and the second substrate 20) in the first portion 61 is greater than the gap between the pair of substrates (the first substrate 10 and the second substrate 20) in the second portion 62.

Although the present disclosure is applied to the transmissive type liquid crystal apparatus 100 in the exemplary embodiments described above, the present disclosure may also be applied to a reflective type liquid crystal apparatus.

Installation Example to Electronic Device

Figure 14:
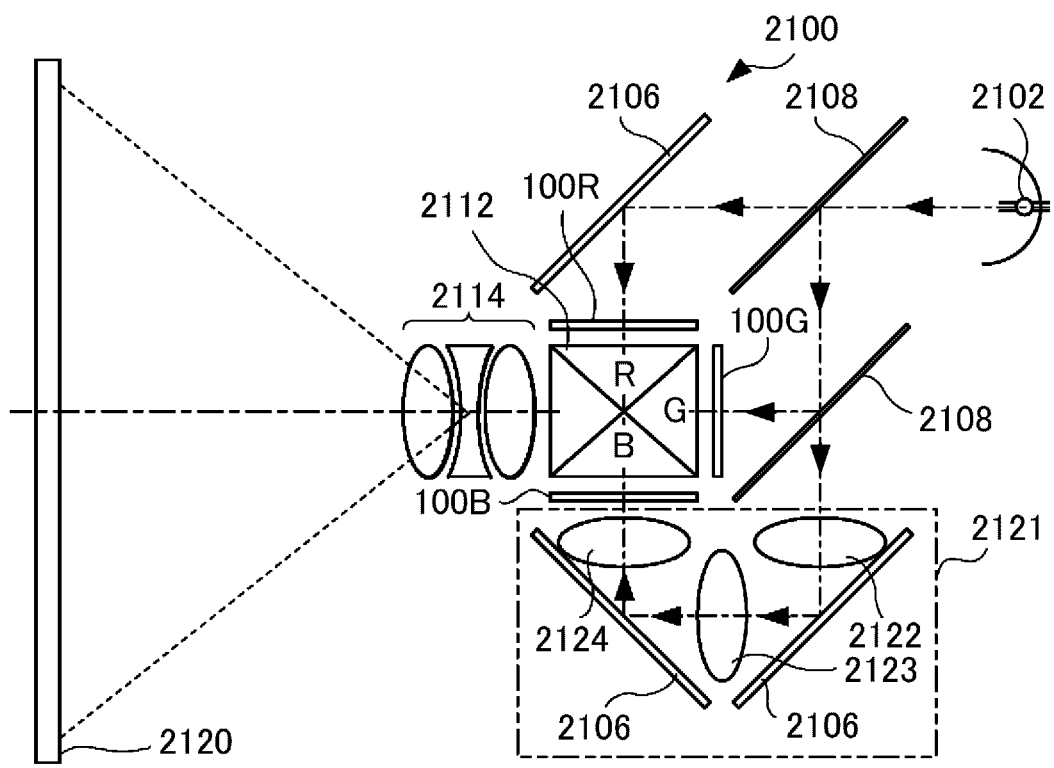
FIG. 14 is an explanatory view of a projection-type display apparatus (electronic device) employing the liquid crystal apparatus to which the present disclosure is applied.

An electronic device employing the liquid crystal apparatus 100 according to the above-described exemplary embodiments will be described below. FIG. 14 is a schematic configuration diagram of a projection-type display apparatus employing the liquid crystal apparatus 100 to which the present disclosure is applied. An illustration of an optical element such as a polarizing plate is omitted in FIG. 14. A projection-type display apparatus 2100 illustrated in FIG. 14 is an example of an electronic device employing the liquid crystal apparatus 100.

In the projection-type display apparatus 2100 illustrated in FIG. 14, the liquid crystal apparatus 100 according to the above-described exemplary embodiments is used as a light valve and can conduct high-definition and bright display without making the apparatus large. As illustrated in FIG. 14, the projection-type display apparatus 2100 is provided with a lamp unit 2102 (light source unit) with a white light source such as a halogen lamp. Projection light emitted from the lamp unit 2102 is split into three primary colors of red (R), green (G), and blue (B) by three mirrors 2106 and two dichroic mirrors 2108 installed inside. The split projection light is guided to light valves 100R, 100G, 100B corresponding to the primary colors, respectively, and modulated. Note that since the light of the B color has a long optical path as compared to the other light of the R color and the G color, the light of the B color is guided via a relay lens system 2121 including an incidence lens 2122, a relay lens 2123, and an emission lens 2124 to prevent a loss due to the long optical path of the light of the B color.

The light modulated by each of the light valves 100R, 100G, 100B is incident on a dichroic prism 2112 from three directions. Then, at the dichroic prism 2112, the light of the R color and the light of the B color are reflected at 90 degrees, and the light of the G color is transmitted.

Accordingly, an image of the primary colors is synthesized, and subsequently a color image is projected on a screen 2120 by a projection lens group 2114 (projection optical system).

Other Projection-Type Display Apparatuses

Note that the projection-type display apparatus may include a configuration in which an LED light source or the like configured to emit light of each color is used as a light source unit and the light of each color emitted from the LED light source is supplied to another liquid crystal apparatus.

Other Electronic Devices

The electronic device including the liquid crystal apparatus 100 to which the present disclosure is applied is not limited to the projection-type display apparatus 2100 of the above-described exemplary embodiment. Examples of the electronic device may include a projection-type head up display (HUD), a direct-view-type head mounted display (HMD), a personal computer, a digital still camera, and a liquid crystal television.

What is claimed is:

1. A liquid crystal apparatus comprising:
a pair of substrates;
a seal material provided between the pair of substrates;
a liquid crystal provided on an inner side of the seal material; and
a circulation flow path provided between a display area on an inner side of the seal material and the seal material, and configured to cause the liquid crystal to flow, wherein
the circulation flow path has a higher adsorptivity for ions than the display area does, and the circulation flow path has a surface with lower hydrophobicity than a surface of the display area.

2. A liquid crystal apparatus comprising:
a pair of substrates;
a seal material provided between the pair of substrates;
a liquid crystal provided on an inner side of the seal material;
a circulation flow path provided between a display area on an inner side of the seal material and the seal material, and configured to cause the liquid crystal to flow; and
an alignment film provided to the display area and the circulation flow path, wherein
a surface of the alignment film that is provided to the display area is provided with an organic silane compound layer, and a surface of the alignment film that is provided to the circulation flow path is provided with another organic silane compound layer having lower hydrophobicity than the organic silane compound provided to the display area.

3. A liquid crystal apparatus comprising:
a pair of substrates;
a seal material provided between the pair of substrates;
a liquid crystal provided on an inner side of the seal material;
a circulation flow path provided between a display area on an inner side of the seal material and the seal material, and configured to cause the liquid crystal to flow; and
an alignment film provided to the display area and the circulation flow path, wherein columnar structures of the alignment film that is provided to the circulation flow path has a lower formation density than the columnar structures of the alignment film that is provided to the display area.

4. A liquid crystal apparatus comprising:
a pair of substrates;
a seal material provided between the pair of substrates;
a liquid crystal provided on an inner side of the seal material; and
a circulation flow path provided between a display area on an inner side of the seal material and the seal material, and configured to cause the liquid crystal to flow, wherein
the display area is provided with an alignment film, and
the circulation flow path is provided with an ion adsorption layer having a higher adsorptivity for ions than the alignment film does, and wherein the ion adsorption layer comprises a porous layer of an organic material selected from the group consisting of polyimide, fluororesin, polymethacrylate, polyacrylate, polystyrene, polyethylene, and polypropylene.

5. The liquid crystal apparatus according to claim 1, wherein the circulation flow path is provided with a forced circulation apparatus configured to forcibly cause the liquid crystal to flow in the circulation flow path.

6. The liquid crystal apparatus according to claim 1, wherein a gap between the pair of substrates at the circulation flow path is greater than a gap between the pair of substrates at the display area.

7. The liquid crystal device according to claim 1, wherein the circulation flow path continuously extends along, from among a plurality of sides defining an outer edge of one substrate of the pair of substrates, a first side and a second side adjacent to each other, and is coupled with the display area at two diagonally positioned corners of the display area.

8. The liquid crystal apparatus according to claim 1, wherein the circulation flow path continuously extends along, from among a plurality of sides defining an outer edge of one substrate of the pair of substrates, a first side, a second side adjacent to the first side, and a third side facing the first side and adjacent to the second side, and is coupled with the display area at a portion along the first side and the third side.

9. The liquid crystal apparatus according to claim 1, wherein the circulation flow path includes
a first portion extending in contact with an outer edge of the display area, and
a second portion coupled with the display area through the first portion, and
a gap between the pair of substrates at the first portion is larger than that at the second portion.

10. An electronic device comprising the liquid crystal apparatus described in claim 1.

* * * * *